United States Patent [19]

Guith, II

[11] Patent Number: 4,581,840

[45] Date of Patent: Apr. 15, 1986

[54] FOOT-OPERATED FISHING ROD HOLDER

[76] Inventor: Frederick Guith, II, 11597 Corunna Rd., Lennon, Mich. 48449

[21] Appl. No.: 644,973

[22] Filed: Aug. 27, 1984

[51] Int. Cl.$^4$ .............................................. A01K 97/10
[52] U.S. Cl. ........................................ 43/21.2; 43/15; 43/19.2
[58] Field of Search .......................... 43/15, 19.2, 21.2

[56] References Cited

U.S. PATENT DOCUMENTS

| | | | |
|---|---|---|---|
| 2,482,999 | 9/1949 | Bean | 43/15 |
| 3,126,180 | 3/1964 | Mandolare | 43/21.2 |
| 3,475,847 | 11/1969 | Wilson | 43/15 |
| 3,619,931 | 11/1971 | Brummett | 43/15 |
| 4,133,131 | 1/1979 | Davy | 43/21.2 |
| 4,344,248 | 8/1982 | Brophy, Sr. et al. | 43/15 |
| 4,479,322 | 10/1984 | Koppel | 43/21.2 |

Primary Examiner—Gene P. Crosby
Attorney, Agent, or Firm—Basile Weintraub Hanlon

[57] ABSTRACT

A fishing rod holder suitable for operation by the sportsmen's foot including a base to which a foot pedal is pivotally attached and a vertical support member affixed. The fishing rod holder has a fishing rod receiving member which is pivotally attached to a foot pedal and the support member. The weight of the fishing rod when mounted in the rod holder maintains the holder and rod in an essentially horizontal position. Pressure on the foot pedal counterbalance the weight of the fishing rod causing upward movement. Rapid depression of the foot pedal will set the fish hook. In the preferred embodiment, the fishing rod holder has spikes attached to the lower side of the base to firmly position the device and a set screw located on the fishing rod receiving member to securely attach the fishing rod to the device.

8 Claims, 2 Drawing Figures

U.S. Patent  Apr. 15, 1986  4,581,840
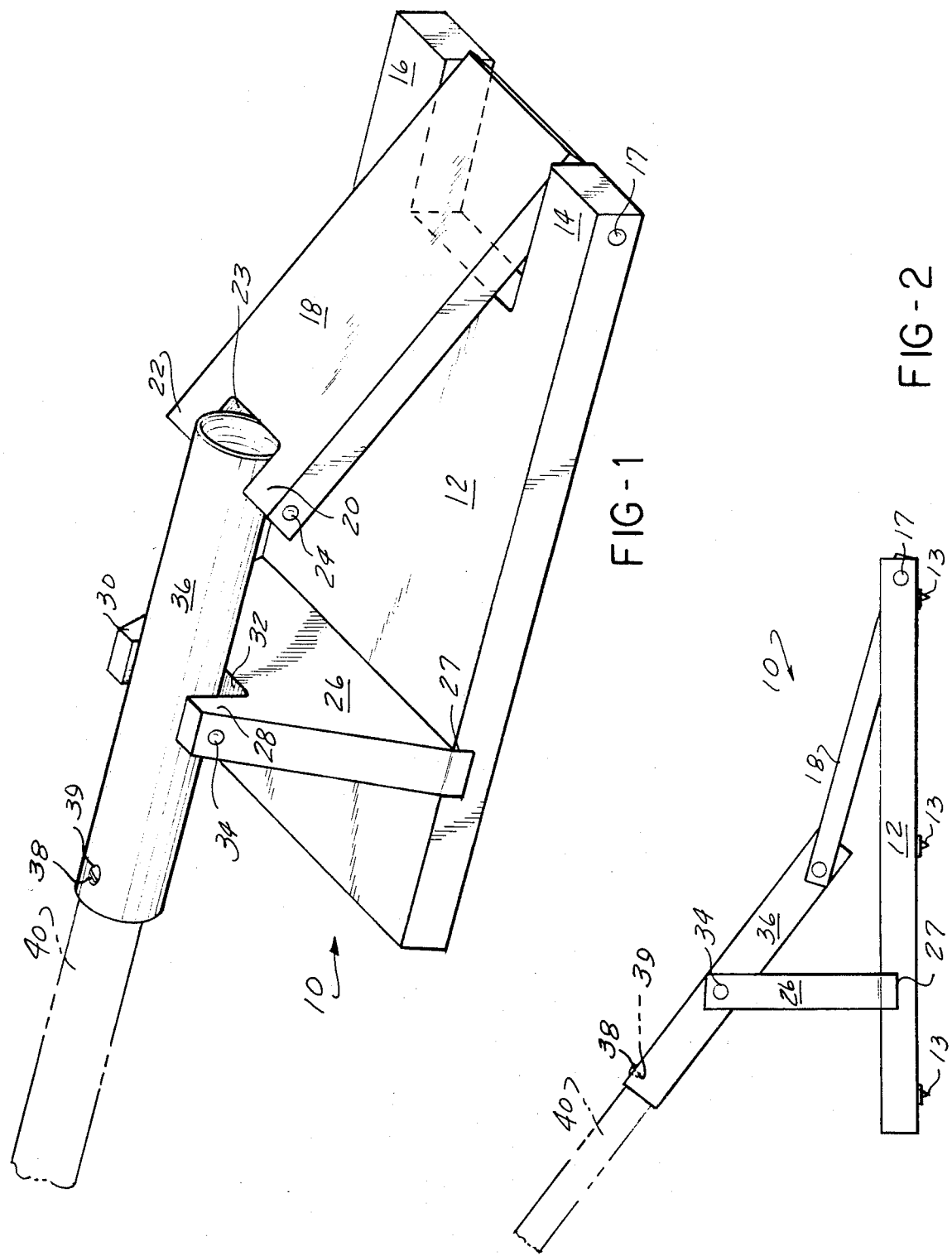

FOOT-OPERATED FISHING ROD HOLDER

BACKGROUND OF THE INVENTION

1. Field of the Invention

The present invention relates to devices for holding and supporting fishing rods. More specifically, the present invention is concerned with fishing rod holders which can be activated and operated by the use of a foot.

2. Description of the Prior Art

During the long periods usually devoted to the sport of fishing, avid fishermen often desire and need a break from holding the fishing rod. Various fishing rod holders have been offered for this purpose. In order to be more effective, the fishing rod holder must provide sufficient means for initiating rod movement in order to animate the bait or lure and attract fish. Since fishermen often wish to operate several rods at one time, it would be advantageous to have a rod holder which allows the fishermen to move the rods without requiring the use of one's hands. This is particularly valuable in the sport of ice fishing where the sportsmen wishes to minimize the exposure of his hands to the cold and blowing winds.

The rod holders currently available do not have a sufficient means for providing rod movement which would move the lure and thereby attract the fish. The rod holders available are typically complex and require a large number of moving parts. In addition, these devices do not provide a simple means for bobbing the fishing rod and thereby activating the bait which would free the sportsmen's hands.

SUMMARY OF THE INVENTION

The present invention which will be subsequently described in greater detail comprises a foot-operated fishing rod holder having a base with an upwardly extending support member. In the preferred embodiment, the base has a plurality of spikes or cleats to hold the fishing rod holder firmly to the surface of the shore or ice flow. The fishing rod holder has a tubular member pivotally mounted at its mid-section to a support member and into one end of which the handle of the fishing rod can be inserted. A foot pedal is pivotally mounted on the base and is attached to the other end of the fishing rod holder causing the rod holder to pivot when the foot pedal is depressed.

When a fishing rod is inserted into the tubular member the weight of the rod will bias the tubular member to pivot toward a horizontal position given that the construction of the holder provides for the support arm being perpendicular to the base member. Alternately, pressure exerted on the foot pedal will allow the tubular member to pivot in a see-saw fashion and thereby swing the rod through an arcuate motion moving the lure and bait up and down. When a fish is caught, the foot pedal can be depressed, rapidly jerking the fishing rod to secure the hook to the fish after which the fish can be reeled in.

It is therefore a primary object of the present invention to provide an inexpensive, easy to use, fishing rod holder.

It is a further object of the present invention to provide a fishing rod holder which allows the sportsmen the freedom to use his hands while providing a need for animating the bait or lure to better attract a fish.

It is still a further object of the present invention to provide a fishing rod holder which is foot-operated and can be placed on any flat surface such as a lakeshore or ice flow.

Further objects, advantages and applications of the present invention will become apparent to those skilled in the art when the accompanying descriptions of one example of the preferred embodiment contemplated for practice of the invention is read in conjunction with the accompanying drawing.

BRIEF DESCRIPTION OF THE DRAWING

The description makes reference to the accompanying drawing wherein:

FIG. 1 is a perspective view of a foot-operated fishing rod holder constructed in accordance with the principles of the present invention with a fishing rod shown in phantom; and FIG. 2 is a side-elevational view showing the holder with the foot pedal depressed and the fishing rod elevated.

DESCRIPTION OF THE PREFERRED EMBODIMENTS

A foot-operated fishing rod holder 10 made according to the invention shown in FIG. 1 comprising a base 12 having an upper face and a lower face and having forked ends 14 and 16 which in turn have an aligned aperture through which a pivot 17 extends. One end of a rectangularly shaped foot pedal 18 is disposed between the forked ends 14 and 16 and mounted on the pivot pin 17 for pivoting movement with respect to the base 12. The foot pedal 18 is mounted to form an acute angle with the upper face of the base 12. The other end of the foot pedal 18 is recessed to define forked members 20 and 22 which define aperture 23 through which a pivot pin 24 extends.

The upper face of the base 12 has a lateral slot 27 within which is disposed one end of a verticle support member 26. The other end of the member 26 is recessed to define forked ends 28 and 30 having defined aperture 32 through which pivot pin 34 extends and on which the mid-section of tubular member 36 is pivotally supported. The vertical support member 26 is of suitable height to maintain a fishing rod 40 in the desired position as illustrated in the drawing.

In this preferred embodiment the tubular member 36 is fabricated from a metal material and one end thereof receives and surrounds the handle 40 of the fishing rod. The opposite end of the tubular member 36 is pivotally connected to the foot pedal 18 by the pivot pin 24.

While with certain smaller rods it may be sufficient to insert the rod in the handle, when heavier rods are used or larger fish are sought it is desirable to secure the rod in the fishing rod holder 10. Thus, the tubular member 36 may have a means for holding the handle 40 of the fishing rod securely in the tubular member 36. The preferred means for releasably securing the rod handle 40 in the tubular member 36 includes a set screw 38 extending through an aperture 39 in the tubular member 36. The aperture 39 can be threaded to receive the screw 38. The aperture 39 is located between the mid-section of the end of the tubular member 36 which receives the handle 40 of the fishing rod. Once the handle 40 is inserted, the set screw 38 can be twisted to contact and hold the handle 40 firmly in position.

In the preferred embodiment, the lower face of the base 12 has a plurality of projections 13 in the form of spikes or cleats which extend into the ground at the shoreline or into an ice flow to firmly secure the foot-operated fishing rod holder 10 in position. The projections 13 can be formed of metal or any polymer or synthetic of sufficient strength and durability to hold the foot-operated fishing rod holder 10 in position. The projections 13 are arranged on the lower face in any suitable pattern. The projections 13 can be secured to the base in any manner; for example, by adhesive or by an extension inserted into the base 12.

FIG. 1 shows the foot-operated fishing rod holder 10 in a position with the rod disposed parallel to the base 12. The weight of the rod is sufficient to counterbalance the weight of the foot pedal 18 and maintain the rod in a horizontal position. Moderate pressure on the foot pedal 18 and release of the same will create upward and downward movement of the tubular support member 36. This movement is translated along the rod 36 and through the fishing line to move the lure upwardly and downwardly.

As shown in FIG. 2, the foot pedal 18 can be completely depressed in a rapid fashion causing the tubular member 36 to pivot upwardly. This motion can cause the hook to set in the fish. Once the fish is so set, the fishermen can reel the fish in.

What has been disclosed by the present invention is a novel, foot-operated fishing pole holder for use by fishermen. The device thus disclosed is portable, easy to use and economical to manufacture.

What is claimed is:

1. A fishing rod holder comprising:
    a base having an upper face and a lower face;
    a support member attached to the upper face of the base and extending upward therefrom;
    a foot pedal having one end pivotally attached to one end of the base for movement with respect to the base; and
    a tubular member having one end pivotally attached to the other end of said foot pedal and the mid-section of the tubular member being rotatably attached to said support member, the other end of the tubular member receiving and supporting a handle end of a fishing rod.

2. A fishing rod holder comprising:
    a base member having a forked end member at one end defining an aligned aperture and a lateral slot located at the mid-section of the base;
    a support member attached to the base at the lateral slot having a forked end member defining an aligned aperture opposed to an attachment point;
    a foot pedal secured at the aligned aperture of the base and pivotally attached to the base at the forked member, the opposite end of the foot pedal having a forked member defining an aligned aperture; and
    a tubular member disposed at one end at the foot pedal aperture pivotally attached to the forked member of the foot pedal and attached at the tubular member mid-section to the aperture formed in the vertical support member, the other end of the tubular member receiving and supporting a handle end of a fishing rod.

3. The fishing rod holder of claim 2 further comprising a means for holding the fishing rod holder firmly in place located on the lower face of the base.

4. The fishing rod holder of claim 2 further comprising a plurality of projections located on the lower face of the fishing rod holder base.

5. The fishing rod holder of claim 4 wherein the projections are a plurality of spikes extending perpendicularly from the lower face of the base.

6. The fishing rod holder of claim 2 wherein the tubular member has a means for releasably securing the handle end of the fishing rod to the fishing rod holder.

7. The fishing rod holder of claim 2 wherein the tubular member further comprises a threaded aperture for receiving a set screw, the set screw capable of releasably attaching the handle end of the fishing rod to the tubular member, the aperture and set screw located between the mid-section and the end of the tubular member which receives the handle end of a fishing rod.

8. The fishing rod holder comprising:
    a base member having an upper and a lower face and a forked end member at one end defining an aligned aperture and a lateral slot located at the mid-section of the upper face of the base;
    a plurality of spikes projecting perpendicularly from the lower face of the base;
    a support member attached to the base at the lateral slot having a forked end member defining an aligned aperture opposed to an attachment point;
    a foot pedal secured at the aligned aperture of the base and pivotally attached to the base and extending over the upper face of the base, the opposite end of the foot pedal having a forked end member defining an aligned aperture;
    a tubular member disposed at one end at the foot pedal aperture pivotally attached to the forked member of the foot pedal and attached at the tubular member mid-section to the aperture formed in the vertical support member; the other end of the tubular member receiving and supporting a handle end of a fishing rod; and
    a set screw extending through an aperture located in the tubular member between the tubular member mid-section and the end which receives the handle of the fishing rod, the handle being movable between a first position in which the fishing rod can be removed and a second position by which the handle is securely fastened in the tubular member.

* * * * *